United States Patent [19]

Frankeny et al.

[11] Patent Number: 5,785,399
[45] Date of Patent: Jul. 28, 1998

[54] BILATERAL MEDIA STORAGE UNIT

[76] Inventors: Richard F. Frankeny, Rte. 4, Box 285, Elgin, Tex. 78621; Verlon E. Whitehead, 8815 Mesa Dr., Austin, Tex. 78759; Ronald E. Hunt, 211 Buck Bend, Georgetown, Tex. 78628

[21] Appl. No.: 748,564

[22] Filed: Nov. 13, 1996

[51] Int. Cl.$^6$ ................................................ A47B 81/06
[52] U.S. Cl. .................. 312/324; 312/9.43; 312/9.64; 312/901; 206/308.1; 206/309; 16/231; 16/225; 220/333
[58] Field of Search ...................... 312/9.41, 9.42, 312/9.43, 9.48, 9.64, 324, 328, 327, 901, 321.5; 206/308.1, 309; 16/231, 225; 220/332, 333, 337

[56] References Cited

U.S. PATENT DOCUMENTS

| | | | |
|---|---|---|---|
| 1,760,103 | 5/1930 | Banschbach | 312/901 X |
| 2,261,806 | 11/1941 | Hills | 312/901 X |
| 2,629,644 | 2/1953 | Heys | 312/324 X |
| 3,374,041 | 3/1968 | Davis | 312/9.64 |
| 3,412,890 | 11/1968 | Rich | 220/334 X |
| 4,214,797 | 7/1980 | Borresen et al. | 312/257.1 |
| 4,538,730 | 9/1985 | Wu | 312/9.43 X |

FOREIGN PATENT DOCUMENTS 505593  5/1939  United Kingdom ............... 220/332

*Primary Examiner*—Peter M. Cuomo
*Assistant Examiner*—Janet M. Wilkens
*Attorney, Agent, or Firm*—Andrew J. Dillon

[57] ABSTRACT

A bilateral media storage unit for storing and carrying CD ROMs, computer diskettes, removable disk storage devices and the like. The storage unit includes a discus shaped portable housing having a generally bowl shaped lower base component and a generally bowl shaped upper cover component which are coupled together at opposite points on their peripheries by selectively releasable hinges which pivotally couple the upper cover component to the lower base component and which release the upper cover component to pivot away from the lower base component when released. An accordion pleated extendable media receptacle is mounted within the portable housing. The accordion pleated extendable media receptacle includes a first group of extensible slots which are adapted to receive a first group of substantially planar storage media and a second group of extensible slots which are adapted to receive a second group of substantially planar storage media wherein the first group of extensible slots are extended in response to a pivoting of the upper cover component away from the lower base component in a first direction and wherein the second group of extensible slots are extended in response to a pivoting of the upper cover component away from the lower base component in a second direction.

15 Claims, 5 Drawing Sheets

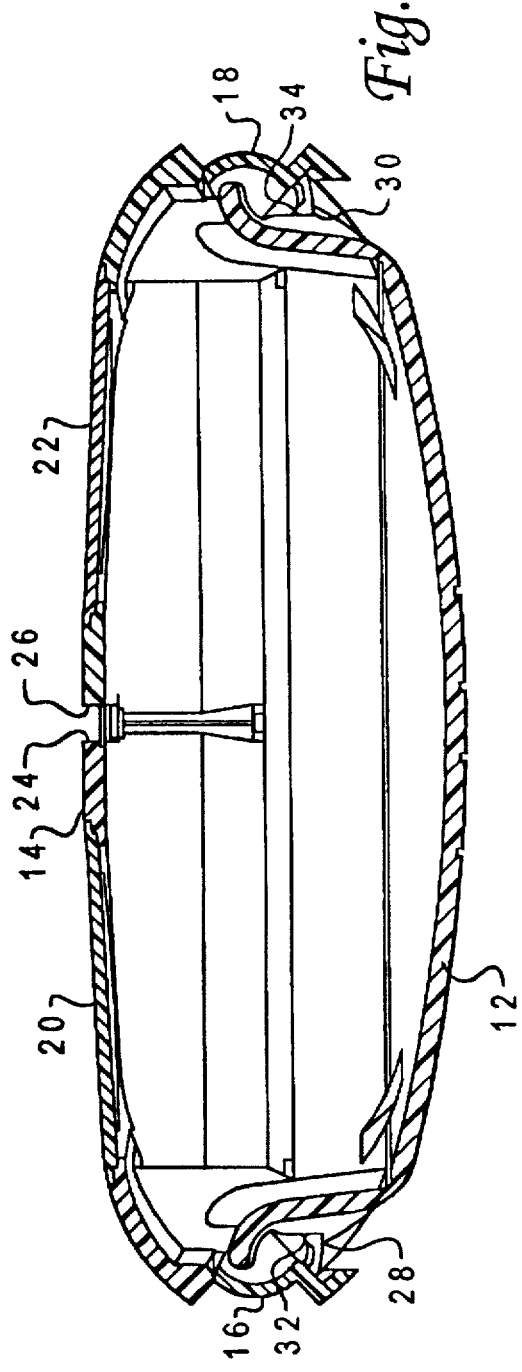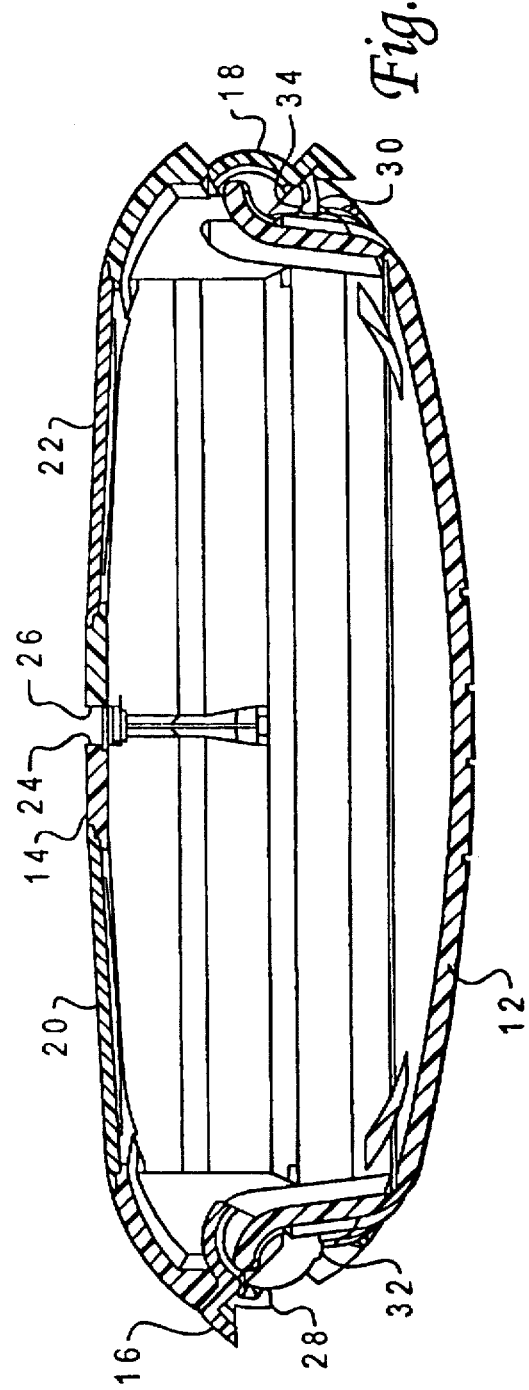

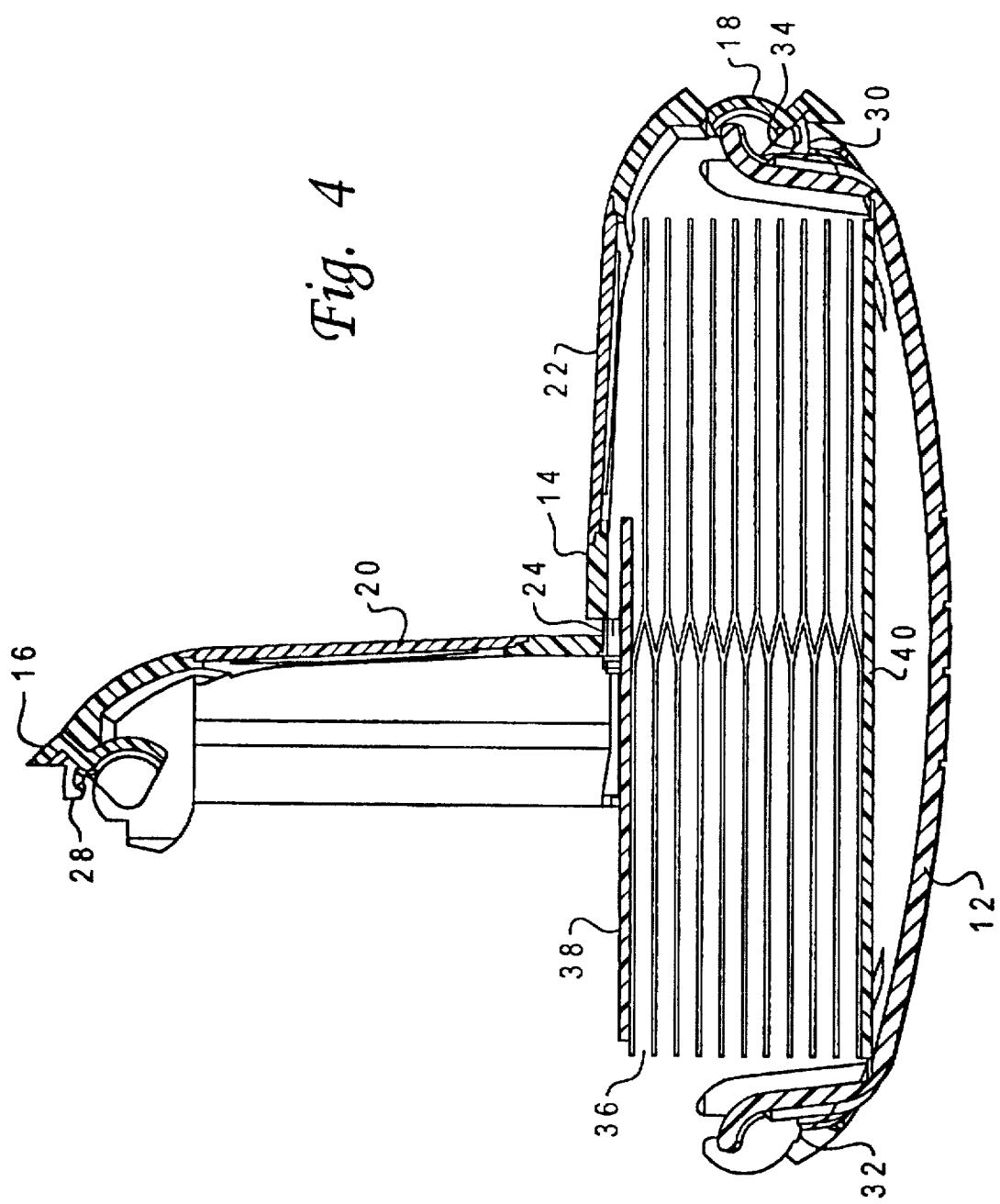

BILATERAL MEDIA STORAGE UNIT

BACKGROUND OF THE INVENTION

1. Technical Field

The present invention relates in general to storage devices for recording media and in particular to storage devices for storing and carrying substantially planar storage media. Still more particularly, the present invention relates to an apparatus for storing and carrying a large number of substantially planar storage media in a manner which permits the efficient removal of a selected media object.

2. Description of the Related Art

Storage devices for recording media are generally known. Such storage devices may include CD ROMs, computer diskettes or removable disk storage devices. Such storage media often encounters special problems of handling and storage due to their delicate nature and flat recorded surfaces. It is therefore preferable to handle such recording media in a manner which avoids damaging the recorded surfaces.

Compact disks are one such storage media which generally have optically readable data encoded on flat recorded surfaces. Compact disks are generally sold in plastic boxes which are sometimes referred to as "jewel boxes". Most compact disk boxes which are utilized to package compact disks for sale are substantially standardized in size and shape. Most are rectangular and having a mounting hub for holding the CD by its center aperture. Compact disk boxes are usually kept after purchase for storage devices for a single compact disk. Additional types of storage devices are therefore needed to organize and store multiple compact disk boxes.

Similarly, computer diskettes often are purchased in a cardboard box capable of holding one or more diskettes; however, such boxes are not intended for long term storage use and the integrity of such boxes may suffer due to wear and tear.

Additionally, the utilization of removable disk storage devices and PCM-CIA devices creates an additional problem of storage and safe transportation.

U.S. Pat. No. 4,702,533 describes a device for storing flat recording media in which compact disks are vertically stacked in outwardly sliding, open-top trays. Each tray is composed of a lower portion of the original compact disk box, which is slidable along parallel lateral guide rails. A locking mechanism is provided to prevent the trays from inadvertently sliding out. However, the device described in the aforementioned patent is not practical as a portable carrier, since the space for each compact disk box is required. Also, sliding tray mechanisms tend to be mechanically complex and quite costly to produce.

More recently, U.S. Pat. No. 4,875,743 disclosed an apparatus for storing a plurality of disk shaped recording media which includes a housing and a plurality of thin substantially C-shaped lever members, each of which has an inner circumferential surface for holding a disk shaped recording media by an outer circumferential surface of the recording media. Each lever member is pivotally connected to the housing by a pivot post and is pivotally moveable into and out of the housing. A lock mechanism prevents the lever members from pivoting out of the housing, while a detent mechanism holds the unlocked lever in either a closed or opened position. This device represents an advance over the previously discussed device; however, it is necessary to manufacture a separate housing for each compact disk which must then be pivotally mounted within the storage apparatus of the aforementioned patent.

U.S. Pat. No. 5,101,972, issued to one of the inventors herein named, discloses a portable recording media storage apparatus for storing and carrying a number of disk shaped recording media, such as records or compact discs. This device includes a housing having a pivotally coupled lower base component and an upper cover component which encompass a large of slots therein which retain disk shaped recording media in parallel adjacent positions. An axially displaceable selector is mounted to the upper cover and is utilized to select and automatically retain a particular disk within the upper cover component during pivotal movement of the upper cover relative to the lower base component, so that the selected disk may be readily removed manually from the upper cover component.

While the aforementioned patent discloses a technique for carrying and storing a large number of storage media devices, it is not universally applicable to computer diskettes or removable storage devices and cannot be easily adapted for utilization with such devices.

It should therefore be apparent that a need exists for a media storage unit which can be adapted to store multiple types of storage media and which is capable of storing and carrying the storage media in a manner which is both safe and which permits efficient retrieval.

SUMMARY OF THE INVENTION

It is therefore one object of the present invention to provide an approved apparatus for storing storage media.

It is another object of the present invention to provide an improved apparatus for storing and transporting substantially planar storage media.

It is yet another object of the present invention to provide an improved apparatus for storing and carrying a large number of substantially planar storage media in a manner which accommodates multiple types of storage media and which permits efficient removal of a selected storage media from a plurality of storage media.

The foregoing objects are achieved as is now described. A bilateral media storage unit is disclosed for storing and carrying CD ROMs, computer diskettes, removable disk storage devices and the like. The storage unit includes a discus shaped portable housing having a generally bowl shaped lower base component and a generally bowl shaped upper cover component which are coupled together at opposite points on their peripheries by selectively releasable hinges which pivotally couple the upper cover component to the lower base component and which release the upper cover component to pivot away from the lower base component when released. An accordion pleated extendable media receptacle is mounted within the portable housing. The accordion pleated extendable media receptacle includes a first group of extensible slots which are adapted to receive a first group of substantially planar storage media and a second group of extensible slots which are adapted to receive a second group of substantially planar storage media wherein the first group of extensible slots are extended in response to a pivoting of the upper cover component away from the lower base component in a first direction and wherein the second group of extensible slots are extended in response to a pivoting of the upper cover component away from the lower base component in a second direction.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a sectional view of the housing of the bilateral media storage unit of FIG. 1 with the media receptacle removed;

FIG. 3 is a sectional view of the bilateral media storage unit of FIG. 2 with one releasable hinge released;

FIG. 4 is a sectional view of the housing of the bilateral media storage unit of FIG. 1 with the media receptacle in place;

DETAILED DESCRIPTION OF PREFERRED EMBODIMENT

Figure 1:
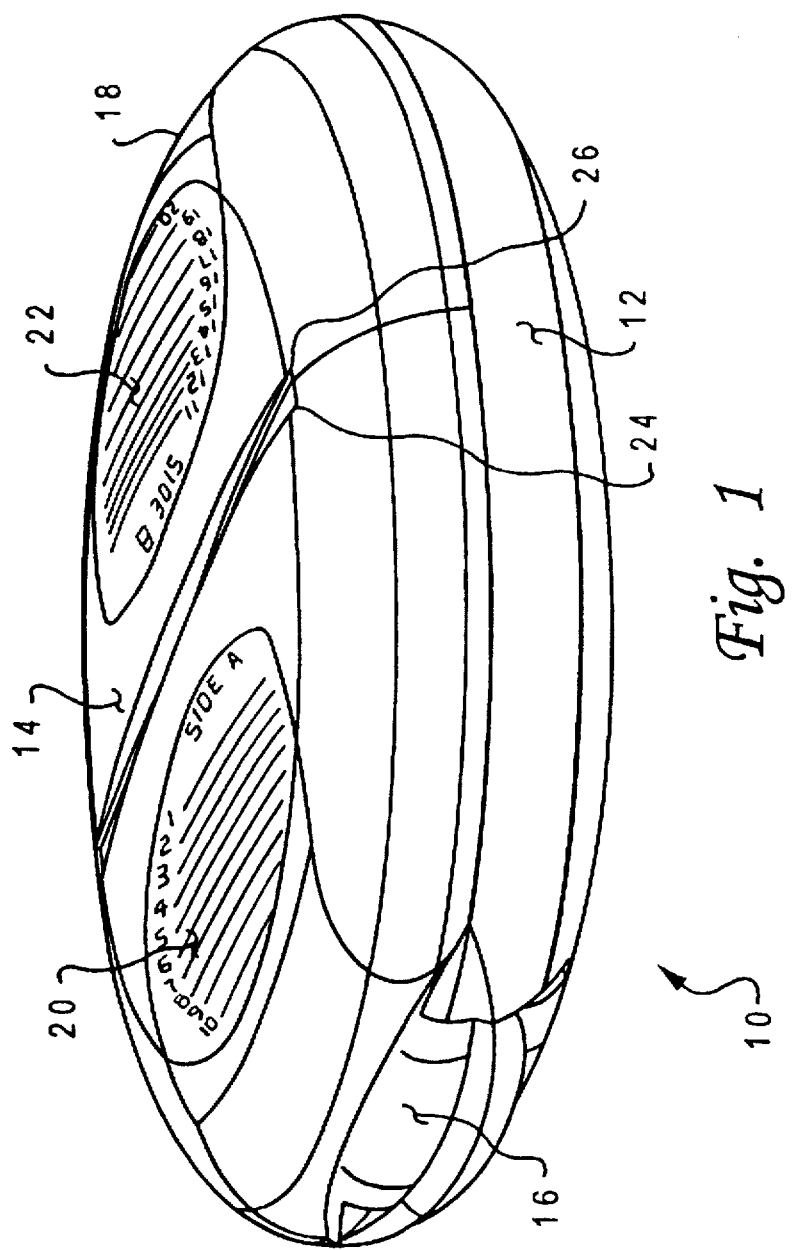
FIG. 1 is a perspective view of the bilateral media storage unit of the present invention.

With reference now to the figures and in particular with reference to FIG. 1, there is depicted a perspective view of a bilateral media storage unit 10 manufactured in accordance with the present invention. As illustrated, bilateral media storage unit 10 is generally discus shaped and includes a generally bowl shaped lower base component 12 and a generally bowl shaped upper cover component 14. Of course, those skilled in the art will appreciate that the bilateral media storage unit of the present invention may also be constructed in a rectangular or square shape without departing from the spirit and intent of the present invention.

Disposed at the joint between upper cover component 14 and lower base component 12, is a releasable hinge 16, the operation of which will be explained in greater detail herein. Similarly, a releasable hinge 18 (not shown) is disposed between upper cover component 14 and lower base component 12 at a point which is generally diametrically opposed to the position of releasable hinge 16.

As illustrated, upper cover component 14 is divided generally in half and a pair of live hinges 24 and 26 are provided. In the depicted embodiment of bilateral media storage unit 10, upper cover component 14 and lower base component 12 are constructed of a durable molded plastic such as Santoprene®, a registered trademark of Monsanto. Those having skill in the art will appreciate that live hinge 24 and live hinge 26 may be provided by choosing a plastic material of the appropriate flexibility and by molding the portion of upper cover component 14 which forms live hinge 24 and live hinge 26 utilizing a thinner portion of material.

Also depicted in FIG. 1 are label mounting areas 20 and 22. Label mounting areas 20 and 22 are utilized to provide a mounting area for a label which lists identifying indicia associated with each of the storage media stored within bilateral media storage unit 10. While label mounting areas 20 and 22 are each depicted on the exterior surface of upper cover component 14, those skilled in the art, upon reference to the specific specification, will note that label mounting areas 20 and 22 may also be provided on the interior surface of upper cover component 14, which will be visible when the bilateral media storage unit 10 is operated in a manner which will be described herein.

Referring now to FIG. 2, there is depicted a sectional view of the portable housing of bilateral media storage unit 10 of FIG. 1 with the media receptacle removed. As illustrated, each releasable hinge 16 includes a detent. Thus, detent 28 is mounted to releasable hinge 16 and detent 30 is mounted to releasable hinge 18. Each detent mates with a respective latch. Thus, detent 28 mates with latch 32 while detent 30 mates with latch 34.

In this manner, as will be depicted in greater detail below, upper cover component 14 may be pivotally coupled to lower base component 12 utilizing either releasable hinge 16 or releasable hinge 18, permitting access to bilateral media storage unit 10 from either side.

With reference now to FIG. 3, there is depicted a sectional view of bilateral media storage unit 10 of FIG. 2 wherein releasable hinge 16 has been rotated, in a clockwise direction, to the release position. As depicted, rotation of releasable hinge 16 removes detent 28 from latch 32 and thus, the left most end of upper cover component 14 is released from lower base component 12. When so released, upper cover component 14 may be raised, while pivotally coupled to lower base component 12 at its right most end. Additionally, as will be depicted below, upper cover component 14 may also be flexed along the center axis thereof utilizing live hinge 24 and live hinge 26.

Referring now to FIG. 4, there is depicted a sectional view of the portable housing of bilateral media storage unit 10 of FIG. 1 with a media receptacle in place. As depicted, releasable hinge 16 has been released, releasing detent 28 from latch 32. One half of upper cover component 14 has been raised as a result of the flexibility of live hinge 24 and live hinge 26.

Mounted within the portable housing formed by lower base component 12 and upper cover component 14 is a zig zag fold media receptacle 36. Media receptacle 36 is preferably formed of a suitable flexible cloth-like material, such as non-woven polyester spun fabric which is lint free and will not scratch the highly polished surface of certain storage media, such as a compact disc. One example of such a fabric is Sontara™, manufactured by DuPont Corporation. Alternatively, other fabric or paper materials may be utilized, including plastics or other such materials.

When formed of an elongate flexible web having a continuous zig zag fold, multiple media receptacle slots are formed. Each media receptacle slot is preferably sized so as to accommodate a CD ROM, computer diskette, removable disk drive or PCM-CIA card.

Each side of media receptacle 36, when constructed in the manner depicted in FIG. 4, presents a separate group of extendable media slots which, when bilateral media storage unit 10 is operated in the manner described herein, will extend to permit rapid and efficient insertion and removable of substantially planar storage media.

One technique for forming zig zag fold media receptacle 36 is illustrated in copending application Ser. No. 08/652,377, filed May 23, 1996, by two of the present inventors. The content of that copending application is hereby incorporated herein by reference thereto.

Still referring to FIG. 4, it can be seen that the upper portion of media receptacle 36 is fixedly mounted to a top plate 38 which is then mounted to the center portion of upper cover component 14, generally below live hinge 24 and live hinge 26. This top plate is provided, in manner which will illustrated with respect to FIGS. 5 and 6, so that the plurality of slots provided within media receptacle 36 may be extended in response to a pivoting of upper cover component 14 with respect to lower base component 12.

Similarly, a bottom plate 40 is also mounted to the bottom of media receptacle 36. Bottom plate 40 preferably comprises a rigid plastic plate having multiple live hinges (not shown) mounted at each corner thereof to permit the lower most slots within media receptacle 36 to be pivoted upwardly out of lower base component 12 in the manner depicted below.

Figure 5:
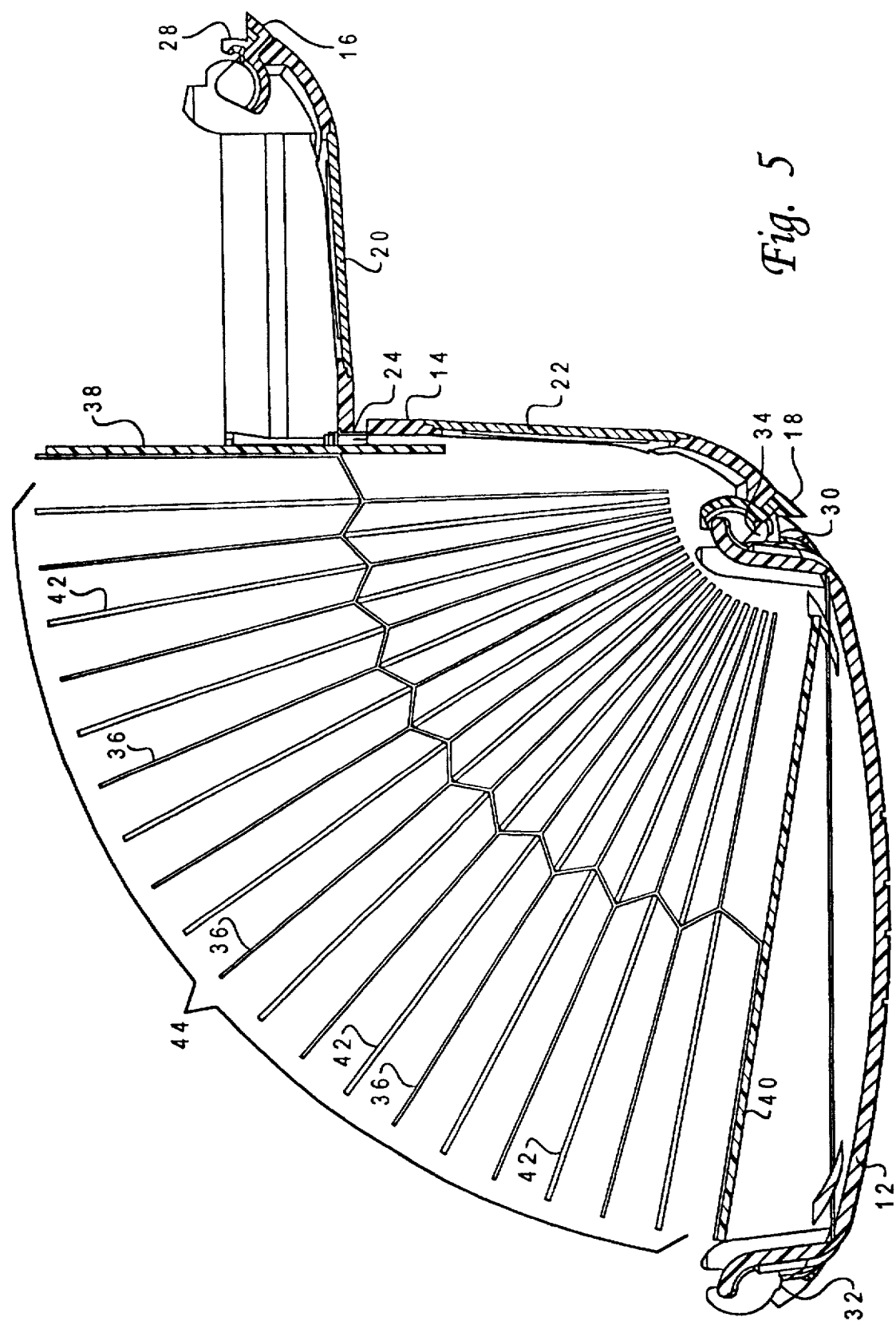
FIG. 5 is a sectional view of the housing of the bilateral media storage unit of FIG. 1 in an open position, with a first side of the media receptacle extended.

With reference now to FIG. 5, there is depicted a sectional view of the portable housing of bilateral media storage unit 10 of FIG. 1 in an open position, with a first side of media receptacle 36 extended. As depicted, upper cover component 14 has been pivotally rotated with respect to lower base component 12 about releasable hinge 18. Top plate 38, rigidly attached to upper cover component 14 and media receptacle 36 has caused media receptacle 36 to extend, exposing a first group of media slots 44. Thus, as depicted, multiple planar media 42 may be inserted into media receptacle 36 in the group of slots thus exposed.

As described above, bottom plate 40 has pivoted upwardly, at the left most end thereof, out of lower base component 12 to permit planar media 42 stored within the lowermost slots within media receptacle 36 to be inserted and retrieved. Further, it should be noted that label mounting area 20, in the configuration depicted within FIG. 5, can easily mount identifying indicia for each planar media 42 on the interior surface of upper cover component 14 where it will visually accessible by the user due to the flexing of upper cover component 14 at live hinge 24 and live hinge 26. As depicted, ten planar storage media such as CD ROMs, computer diskettes or the like, may be inserted within the first group of slots 44 which are extended by the pivotal action of upper cover component 14 with respect to lower base component 12.

Figure 6:
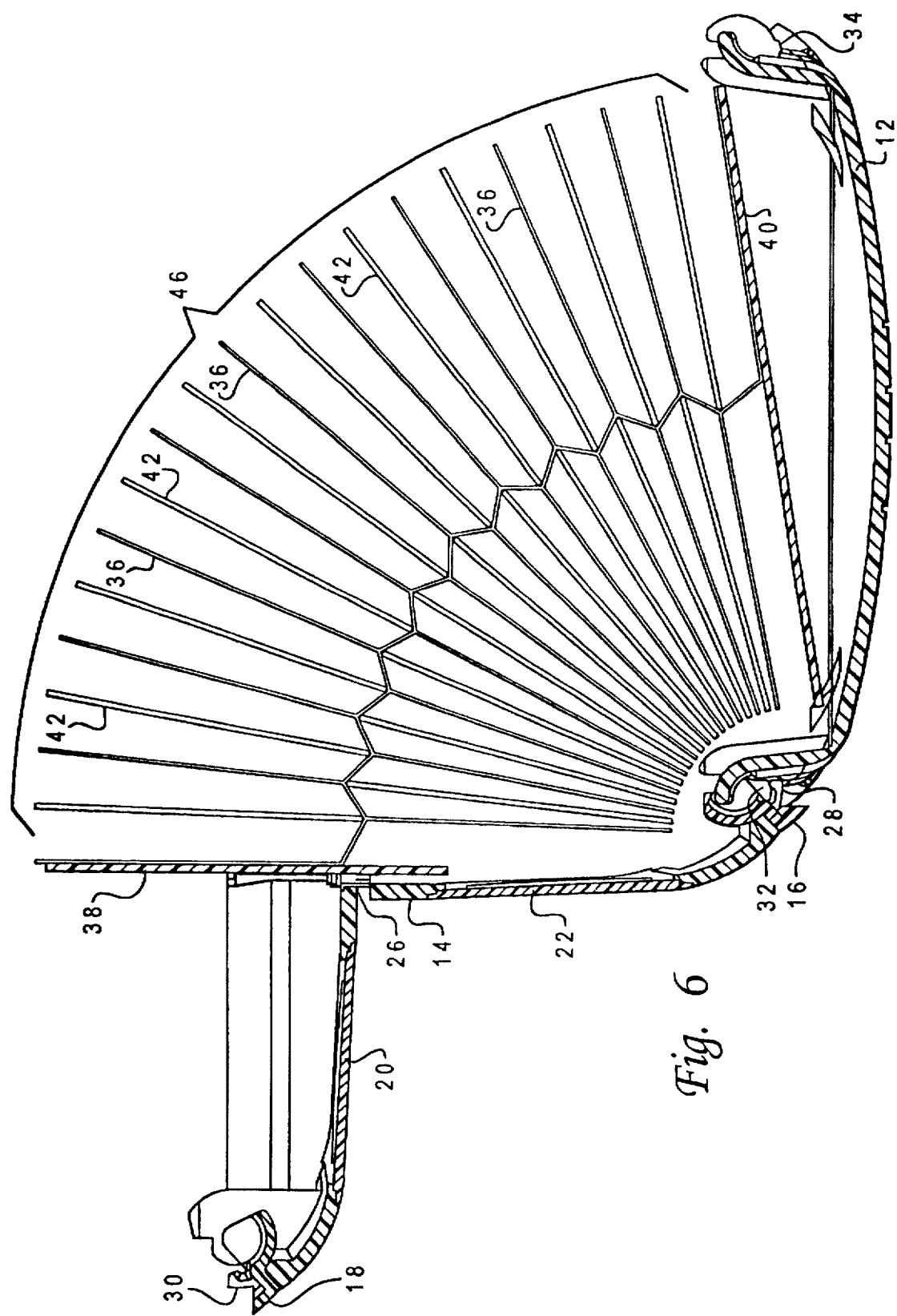
FIG. 6 is a sectional view of the housing of the bilateral media storage unit of FIG. 1 in an open position, with a second side of the media receptacle extended.

Finally, referring to FIG. 6, there is depicted a sectional view of the portable housing of bilateral media storage unit 10 of FIG. 1 in an open position, with a second side of media receptacle 36 extended. As depicted in FIG. 6, upper cover component 14 is pivotally rotated away from lower base component 12 at releasable hinge 16. Releasable hinge 18 has been released and upper cover component 14 is thus free to pivot in the opposite direction from that depicted within FIG. 5.

In the manner depicted herein, a second group of slots 46 is thus extended within media receptacle 36, permitting a second group of planar media 42 to be inserted into the ten slots thus exposed.

This extension occurs, as described above, by the action of top plate 38 rotating in conjunction with upper cover component 14 and the pivoting action of bottom plate 40. Further, as described with respect to label mounting area 22, label mounting area 20 is now visually accessible to a user on the interior surface of upper cover component 14, should that area be desired as a label mounting area.

Upon reference to the foregoing, those skilled in the art will appreciate that the Applicants herein named have created a bilateral media storage unit 10 which, in an efficient manner, permits the storage of multiple planar storage media, such as CD ROMs, computer diskettes or the like. By providing a bilateral media storage unit which permits planar media to be inserted from two different directions, the bilateral media storage unit of the present invention is substantially more efficient than media storage devices known in the prior art.

While the invention has been particularly shown and described with reference to a preferred embodiment, it will be understood by those skilled in the art that various changes in form and detail may be made therein without departing from the spirit and scope of the invention.

We claim:

1. An apparatus for storing and carrying multiple substantially planar storage media, said apparatus comprising:

a portable housing including a lower base component and an upper cover component;

a first selectively releasable hinge means disposed between said lower base component and said upper cover component at a first point for pivotally coupling said lower base component and said upper cover component at said first point and for releasing said upper cover component from said lower base component in response to a release thereof;

a second selectively releasable hinge means disposed between said lower base component and said upper cover component at a second point which is diametrically opposed to said first point, for pivotally coupling said lower base component and said upper cover component at said second point and for releasing said upper cover component from said lower base component in response to a release thereof; and a slotted receptacle disposed within said portable housing having a first plurality of extensible slots adapted to receive a first plurality of substantially planar storage media and a second plurality of extensible slots adapted to receive a second plurality of substantially planar storage media wherein said first plurality of extensible slots are extended in response to a pivoting of said upper cover component away from said lower base component at said first point while said upper cover component is pivotally coupled to said lower base component at said second point and wherein said second plurality of extensible slots are extended in response to a pivoting of said upper cover component away from said lower base component at said second point while said upper cover component is pivotally coupled to said lower base component at said first point.

2. An apparatus for storing and carrying multiple substantially planar storage media according to claim 1 wherein said lower base component is generally bowl-shaped.

3. An apparatus for storing and carrying multiple substantially planar storage media according to claim 2 wherein said upper cover component is generally bowl-shaped.

4. An apparatus for storing and carrying multiple substantially planar storage media according to claim 3 wherein said upper cover component is hinged along one axis thereof.

5. An apparatus for storing and carrying multiple substantially planar storage media according to claim 1 wherein said portable housing is constructed of molded plastic.

6. An apparatus for storing and carrying multiple substantially planar storage media according to claim 1 further including a label mounted to said upper cover component for listing identifying indicia associated with said multiple substantially planar storage media.

7. An apparatus for storing and carrying multiple substantially planar storage media according to claim 6 wherein said label is mounted to said upper cover component exterior to said portable housing.

8. An apparatus for storing and carrying multiple substantially planar storage media, said apparatus comprising:

a portable housing including a lower base component and an upper cover component;

a first selectively releasable hinge means disposed between said lower base component and said upper cover component at a first point for pivotally coupling said lower base component and said upper cover component at said first point and for releasing said upper cover component from said lower base component in response to a release thereof;

a second selectively releasable hinge means disposed between said lower base component and said upper cover component at a second point which is diametrically opposed to said first point, for pivotally coupling said lower base component and said upper cover component at said second point and for releasing said upper cover component from said lower base component in response to a release thereof; and an accordion pleated extendable media receptacle constructed of a zigzag web of flexible material and disposed within said portable housing, said accordion pleated extendable media receptacle having a first plurality of extensible slots adapted to receive a first plurality of substantially planar storage media and a second plurality of extensible slots adapted to receive a second plurality of substantially planar storage media wherein said first plurality of extensible slots are extended in response to a pivoting of said upper cover component away from said lower base component at said first point while said upper cover component is pivotally coupled to said lower base component at said second point and wherein said second plurality of extensible slots are extended in response to a pivoting of said upper cover component away from said lower base component at said second point while said upper cover component is pivotally coupled to said lower base component at said first point.

9. An apparatus for storing and carrying multiple substantially planar storage media according to claim 8 wherein said lower base component is generally bowl-shaped.

10. An apparatus for storing and carrying multiple substantially planar storage media according to claim 9 wherein said upper cover component is generally bowl-shaped.

11. An apparatus for storing and carrying multiple substantially planar storage media according to claim 10 wherein said upper cover component is hinged along one axis thereof.

12. An apparatus for storing and carrying multiple substantially planar storage media according to claim 8 wherein said portable housing is constructed of molded plastic.

13. An apparatus for storing and carrying multiple substantially planar storage media according to claim 8 further including a label mounted to said upper cover component for listing identifying indicia associated with said multiple substantially planar storage media.

14. An apparatus for storing and carrying multiple substantially planar storage media according to claim 13 wherein said label is mounted to said upper cover component exterior to said portable housing.

15. An apparatus for storing and carrying multiple substantially planar storage media according to claim 8 wherein said accordion pleated extendible media receptacle is constructed of non-woven polyester spun material.

* * * * *